(12) United States Patent
Noble

(10) Patent No.: US 8,806,665 B2
(45) Date of Patent: Aug. 19, 2014

(54) PEST ENTRAPMENT DEVICE AND METHOD

(76) Inventor: Kenneth Christopher Noble, Plymouth, MN (US)

(*) Notice: Subject to any disclaimer, the term of this patent is extended or adjusted under 35 U.S.C. 154(b) by 434 days.

(21) Appl. No.: 12/951,707

(22) Filed: Nov. 22, 2010

(65) Prior Publication Data

US 2011/0119806 A1    May 26, 2011

Related U.S. Application Data

(60) Provisional application No. 61/263,112, filed on Nov. 20, 2009.

(51) Int. Cl.
*A42B 1/24* (2006.01)
*A41D 13/00* (2006.01)
*A01M 1/14* (2006.01)
*A01M 1/02* (2006.01)

(52) U.S. Cl.
CPC ............... *A41D 13/001* (2013.01); *A01M 1/14* (2013.01); *A01M 1/023* (2013.01); *A42B 1/24* (2013.01)
USPC ........................................... 2/209.13; 43/107

(58) Field of Classification Search
USPC .......... 2/4, 410, 209.13, 69; 473/406; 43/107; 239/36
See application file for complete search history.

(56) References Cited

U.S. PATENT DOCUMENTS

| | | | |
|---|---|---|---|
| 1,133,542 A * | 3/1915 | Deal | 43/57.1 |
| 1,780,408 A * | 11/1930 | Smith | 239/36 |
| 2,177,670 A * | 10/1939 | Peirson | 43/107 |
| 2,615,754 A * | 10/1952 | Lindenberg | 239/36 |
| 3,708,908 A | 1/1973 | Levey | |
| 3,896,995 A * | 7/1975 | Lelicoff | 239/36 |
| 4,168,591 A | 9/1979 | Shaw | |
| 4,360,987 A | 11/1982 | Lowder | |
| 4,627,621 A * | 12/1986 | Tate | 473/286 |
| 4,694,604 A | 9/1987 | Mitchell | |
| 4,905,406 A * | 3/1990 | Warner | 43/107 |
| 4,930,251 A | 6/1990 | Crisanti | |
| 5,143,371 A * | 9/1992 | Strahan | 473/285 |
| 5,189,830 A | 3/1993 | Montemurro | |
| 5,305,999 A * | 4/1994 | Tate | 473/406 |
| 6,162,454 A * | 12/2000 | Ahr et al. | 424/411 |
| 6,209,256 B1 | 4/2001 | Brittin et al. | |
| 6,233,738 B1 * | 5/2001 | Siracusa | 2/4 |
| 6,357,642 B1 * | 3/2002 | Marchessault et al. | 224/269 |
| 6,422,955 B1 * | 7/2002 | Lopez | 473/406 |
| 6,516,559 B1 | 2/2003 | Simchoni et al. | |
| 6,718,687 B2 | 4/2004 | Robison | |
| 6,920,716 B2 | 7/2005 | Kollars, Jr. et al. | |
| 6,966,851 B1 * | 11/2005 | England et al. | 473/406 |
| 7,074,830 B2 * | 7/2006 | Durand et al. | 514/557 |
| 7,171,778 B1 | 2/2007 | Thompson, III | |
| 7,487,554 B1 * | 2/2009 | Epstein et al. | 2/209.13 |
| 7,536,824 B2 | 5/2009 | Durand et al. | |

(Continued)

*Primary Examiner* — Richale Quinn

(57) ABSTRACT

The invention is directed at to a pest entrapment device for attracting and trapping flying pests around the head of a person. The apparatus includes an attachable device having at least one member, which member contains at least one cavity to hold a pest attractant. The attachable device is affixed to a head covering on the underside of a bill, brim, visor or the like. The pest attractant can be of a combination of grease, carbon dioxide, sweetener, and a sticky, viscid matter. The pest attractant also acts as a trapping substance to capture the flying insects. The pest entrapment device can be removed for cleaning and reapplication of the pest attractant.

15 Claims, 8 Drawing Sheets

(56) References Cited

U.S. PATENT DOCUMENTS

| | | |
|---|---|---|
| 7,721,570 B2 * | 5/2010 | Lawrence ...................... 63/1.16 |
| 7,766,769 B2 * | 8/2010 | Lueders ........................ 473/408 |
| 7,988,984 B2 * | 8/2011 | Hockaday .................... 424/403 |
| 2002/0034992 A1 * | 3/2002 | Tate .............................. 473/406 |
| 2006/0042155 A1 | 3/2006 | Nolen |
| 2007/0065476 A1 * | 3/2007 | Sexton et al. ................. 424/410 |
| 2007/0228184 A1 * | 10/2007 | Chen ............................... 239/36 |
| 2008/0163409 A1 * | 7/2008 | Humiston ......................... 2/410 |
| 2009/0205095 A1 * | 8/2009 | Needham ............................. 2/4 |

* cited by examiner

006
PEST ENTRAPMENT DEVICE AND METHOD

RELATED APPLICATIONS

This application claims priority to U.S. Provisional Application Ser. No. 61/263,112 filed with the United States Patent and Trademark Office on Nov. 20, 2009 and is incorporated herein by reference in its entirety.

FIELD OF THE INVENTION

The invention generally relates to a pest entrapment device and method for controlling and entrapping flying pests. More particularly, the present invention relates to an apparatus affixed to the underside of a person's head covering, such as a bill, brim, visor, or the like that attracts and captures flying insects.

BACKGROUND

Typically, persons spending time outside will apply chemical repellants to their skin and clothing in an attempt to keep flying insects away. Flying insects that come near the face can bite the skin and be annoying. Many of the repellants available today are prohibited from use in certain outdoor activities, like golfing, for example, because of their chemical destructiveness to grass. Most insect repellants contain chemicals such as DEET, which has secondary harmful effects to humans and the environment. A majority of these repellents come in the form of sprays that are difficult to control and localize to prevent harming the environment. In addition, some people do not want to spray chemicals onto their bodies and clothing. Thus, these people will often end up making use of appendages such as hands to ward off the flying insects. However, this constant warding-off of pests makes enjoying the outdoors very difficult.

Therefore, there is a need for a pest entrapment device that is easy to use, consists of a non-toxic pest attractant, does not need to be sprayed onto a person's body or clothing, can be reapplied, and entraps flying pests that would otherwise be in a person's face.

SUMMARY OF THE INVENTION

In one aspect of the invention, a pest entrapment device may include an artificial pest attractant in combination with heat, sweat, and carbon dioxide, which are natural pest attractants, that are emitted from a person's face. The pest entrapment device can capture flying insects near the source of these natural pest attractants by attaching to the underside of an individual's head covering, for instance the bill, brim, visor, or the like of a baseball cap, hunting/fishing cap, helmet, visor, etc. Another aspect of the pest entrapment device is the removability and transferability of the device from one head covering to another head covering.

In one embodiment of the present invention, a pest entrapment device may include at least one clip consisting of at least three members: a top member, a middle member and a bottom member. The clip can be made out of metal, for example, iron, steel, or the like or any combination thereof, or plastic or composite. The top, middle and bottom members may all be fastened together by soldering, adhesive, fusion, or the like, or the members can be one piece, or any combination thereof. The middle member can be a flexible U-shaped piece that is releasable and engageable for expansion and retention over the various sizes of head covering bills, brims, visors, or the like in which the pest entrapment device may be attached to.

The bottom member can have at least one cavity wherein a person can apply the pest attractant for pest capture. The top member of the pest entrapment device can be a solid metal piece in various sizes and shapes. The top member can contain a logo or similar type of advertisement, or it can be engraved or otherwise marked. The top member can be made out of a ferrous metal on which other objects can be magnetically attached to the top member, for example a ball marker.

Another embodiment of the invention can consist of one continuous piece of U-shaped flexible material such as metal or plastic or composite having a top base member and a bottom retaining member. The embodiment can be releasable and engagable with a head covering's bill, brim, visor, or the like. The top base member can be a solid piece in different shapes or sizes. The top base member can contain a logo, advertisement or other design, or can otherwise be engraved or marked. The top base member can also be made out of a ferrous metal in which other objects can be magnetized thereto, for example a ball marker. The bottom retaining member can contain at least one cavity on the outer surface wherein a person can apply the pest attractant for pest capture.

Another embodiment of the invention can include at least one member containing an upper surface and a lower surface. The lower surface can contain at least one cavity to support an insect attractant. The member can be releasably engaged with the underside of a bill, brim, visor or the like of a head covering, for example a baseball cap. The upper surface can include a type of attaching device, for example, adhesive, Velcro™, clip, alligator clip, double-sided tape, snaps, or other fastening device and the like.

Another embodiment of the invention can include at least one attachable attractant visor that can be attached to the underside of a head covering's bill, brim, visor, or the like of a head covering. The attractant visor can be made of plastic or other durable material that is lightweight and flexible to the contours of the underside of head covering's bill, brim, visor or the like. The attractant visor material can be clear or come in different colors. The attractant visor can be one size or it can have at least one perforation in which a person can cut or otherwise resize the attractant visor to size to fit a specific purpose head covering's brim, bill, visor, or the like. The attractant visor can have an upper surface and a lower surface. The upper surface can contain a substance or other adhesive means whereby the attractant visor can be attached to the underside of a head covering's bill, brim, visor, or the like. The upper surface can be attached by using an adhesive, double-sided tape, clips, alligator clips, snaps, Velcro™, and the like. The lower surface can provide a surface for a pest attractant to be applied to and entrap pests. One embodiment of the attractant visor can be that it is reusable wherein the attractant visor can be disengaged from the underside of a head covering's bill, brim, visor or the like, cleaned of entrapped pests, re-applied with pest attractant, and reengaged with the underside of the head covering's bill, brim, visor, or the like.

In another embodiment of the attractant visor, the attractant visor can be disposable, providing for a one-time use application wherein the attractant visor can be temporarily attached to the underside of a head covering's bill, brim, visor, or the like for a period of time and the user would like to remove the attractant visor and throw it away. For example, a disposable attractant visor can be used on a daily basis wherein the disposable attractant visor can be discarded after being used for the day. A new disposable attractant visor can then be attached to the underside of the head covering's bill, brim, visor, or the like. A further embodiment of the attractant visor can consist of layers of material, for example plastic sheets or the like. The attractant visor can have an upper surface and a lower surface. The upper surface can attach to the underside of a head covering's bill, brim, visor or the like by an adhesive, double-sided tape, snaps, Velcro™, clips, alligator clips, and the like. The lower surface can be a thin, hard plastic base wherein sheets of plastic can be attached thereto. The insect attractant can be applied to the outer surface of the top most plastic sheet wherein pests can be entrapped. After entrapment, the top sheet of plastic may be torn from the rest and disposed of, and the pest attractant can be applied to the outer surface of the next plastic sheet. Another embodiment can have the pest attractant already applied to the sheets of plastic so that after one is pulled off and disposed of, pest attractant will already be on the outer surface of the next plastic sheet. This type of disposable plastic sheet can be made out of other suitable material.

A further embodiment of the invention can include a pest entrapment kit. One embodiment of the pest entrapment kit can include at least one pest entrapment device, a pest entrapment device cleaning cloth, and a pest attractant. In one embodiment of the kit, the pest entrapment device is an attractant clip. In another embodiment of the kit, the pest entrapment device can be an attractant visor that can be reusable, disposable, or any combination thereof. The pest attractant can be in a solid or liquid state wherein the pest attractant is dispensed from a pest application device.

The above summary of the various aspects of the invention is not intended to describe each embodiment or every implementation of the invention. Rather, the embodiments are chosen and described so that others skilled in the art may appreciate and understand the principles and practices of the invention. The figures in the detailed description that follows more particularly exemplify these embodiments.

BRIEF DESCRIPTION OF THE DRAWINGS

These as well as other objects and advantages of this invention will be more completely understood and appreciated by referring to the following more detailed description of the exemplary embodiments of the invention in conjunction with the accompanying drawings of which.

Figure 1:
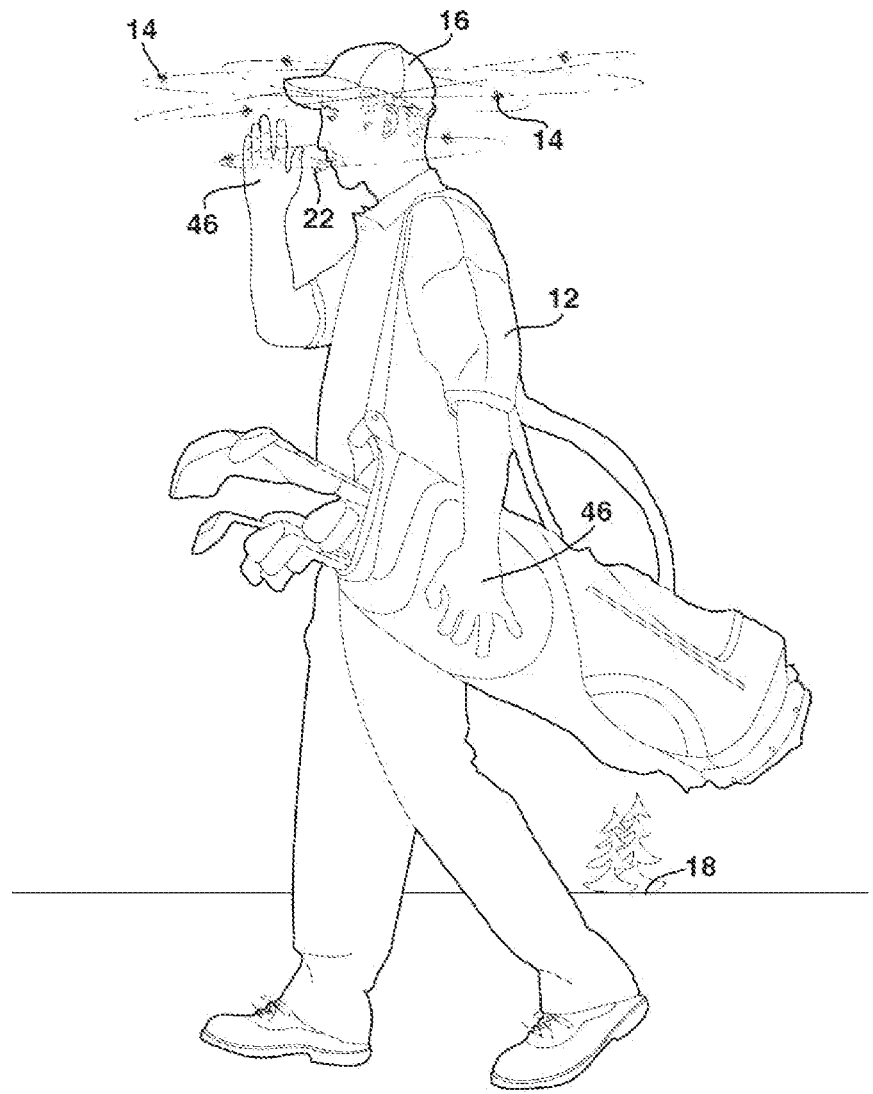
FIG. 1 is a perspective view of a person outside encountering a pest problem.

While the invention is amenable to various modifications and alternative forms, specifics thereof have been shown by way of example in the drawings and will be described in detail. It should be understood, however, that the intention is not to limit the invention to the particular embodiments described. On the contrary, the invention is to cover all modifications, equivalents, and alternatives.

DETAILED DESCRIPTION OF THE PREFERRED EMBODIMENTS

The several embodiments as shown in the figures may allow the user of the pest entrapment device to have multiple choices to certain features and subcombinations of each embodiment, as there are several choices relating to the several embodiments available. Advantages and embodiments of this invention are further illustrated by the following examples, but the particular materials and amounts thereof recited in these examples, as well as other conditions and details, should not be construed to unduly limit this invention.

FIG. 1 is a perspective view of a person 12 outside 18, for example, playing golf and experiencing the environmental problem of pests 14, including biting and flying insects, mites, and ticks. These pests 14 are attracted to the face of a person by a number of chemical and physical factors, including carbon dioxide and water vapor from the person's breath 22, body heat, and chemicals from a person's sweat that sits on the surface of the skin. Additionally, pests 14 are also attracted to certain colors and textures of clothing, as well as to the odor from soaps, perfumes, lotions and hair-care products. While that person may spray or otherwise put on pest repellent to ward off these pests, sometimes these repellents contain toxic chemicals that keep people from applying these repellents to their face. Additionally, sometimes these repellents, because they contain certain chemicals, are not allowed in certain outdoor activities as they may harm the environment, like grass on a golf course. Therefore, a person is left with swatting at these pests 14 as they fly around a person's face with their own hand and putting up with the pests 14.

Figure 2:
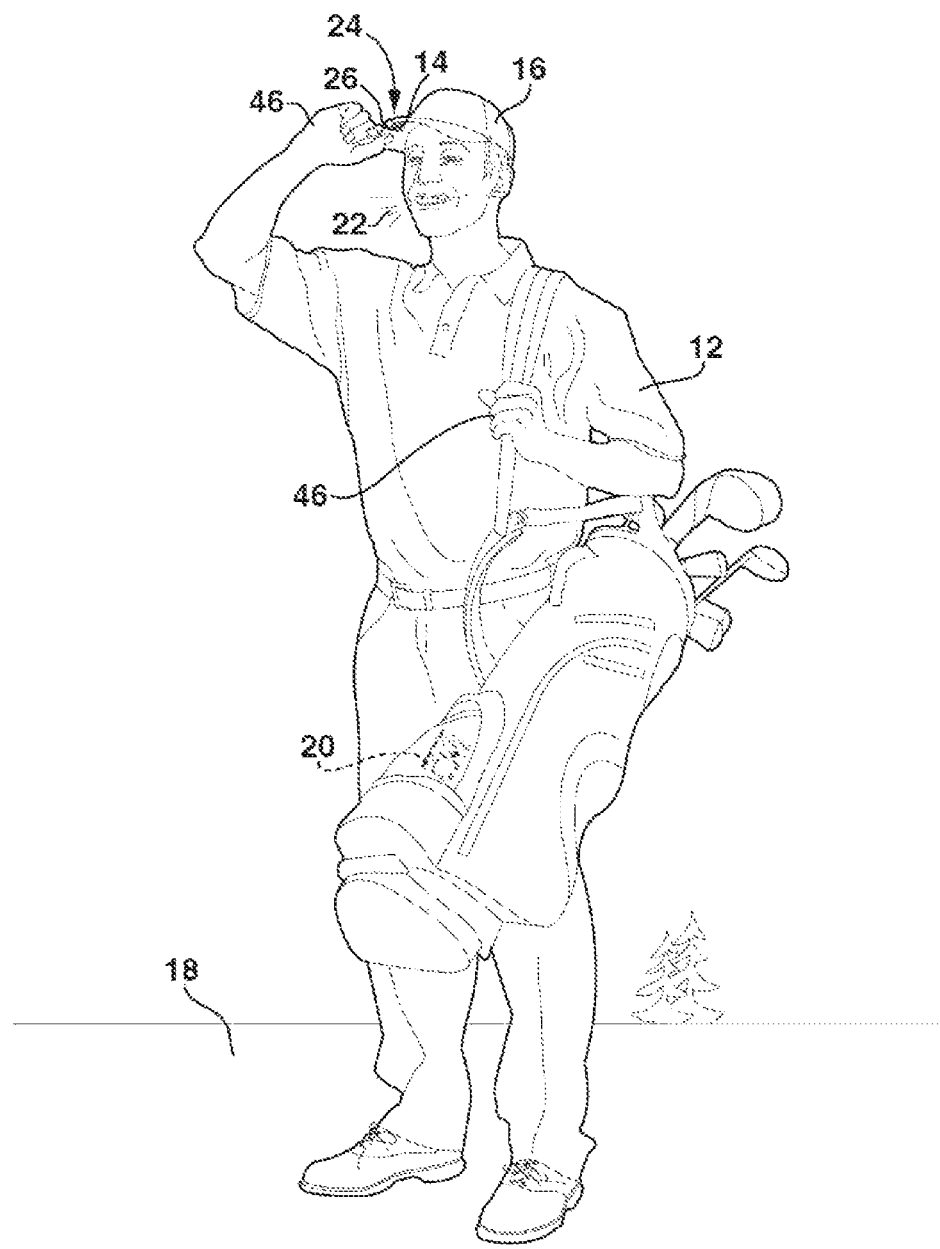
FIG. 2 is a perspective view of a person outside using a pest entrapment device.

FIG. 2 is a perspective view of a person 12 outside 18, for example, playing golf and using the pest entrapment device 24. Once a person decides to go outside, that person may be subjected to pests 14, such as flying and biting flies, etc. These pests 14 are attracted to the person's face because this is where a person's natural attractants for pests are released, such as carbon dioxide and water vapor from the breath 22, body heat, and chemicals in the sweat found on the surface of the skin of the face. A person may use these natural attractants to their benefit by the addition of the pest entrapment device. The entrapment device can consist of an attractant clip 24, which contains an artificial pest attractant 26, that can be releasable and engageable to a person's head covering 16, such as the bill, brim, visor, and the like. The entrapment device's location puts it in the vicinity of where pests 14 are already drawn because of a person's natural attractants, such as their breath 22 and sweat. The entrapment device redirects the pests 14 from the face toward the artificial pest attractant 26, wherein the pests 14 are then trapped and no longer in the person's face. The pest entrapment device can come in a kit 20 that can be easily taken with a person and used, as described more fully in FIG. 3 below.

Figure 3:
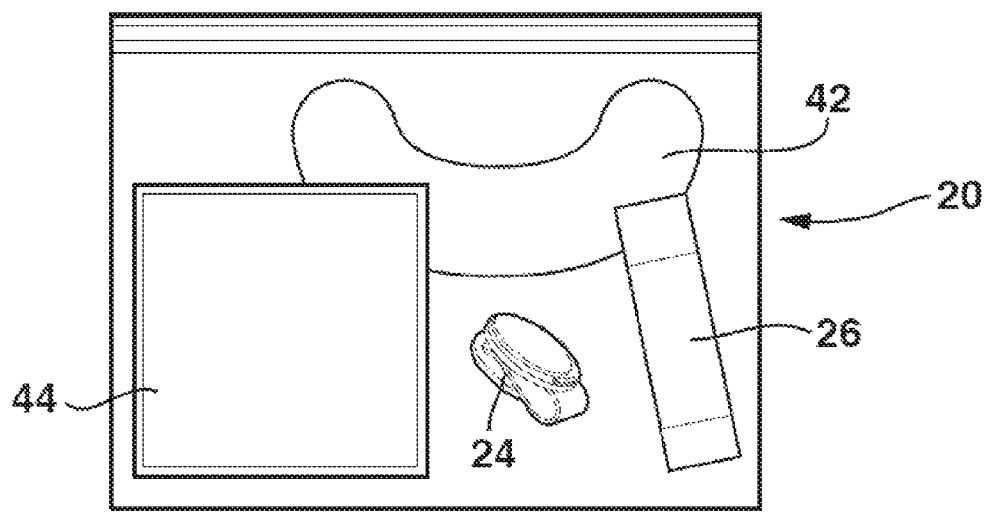
FIG. 3 is a perspective view of a pest entrapment kit.

FIG. 3 is a perspective view of a pest entrapment kit 20. The entrapment kit 20 can easily be carried on or with a person, for example in a purse, golf bag, or the like. The pest entrapment kit 20 can contain an attractant clip 24, an attractant 26, an attractant visor 42 and a cleaning cloth 44. Another embodiment of the pest entrapment kit 20 may include at least one or more of an attractant clip 24, a pest attractant 26, an attractant visor 42, and a cleaning cloth, or any combination thereof.

Figure 4:
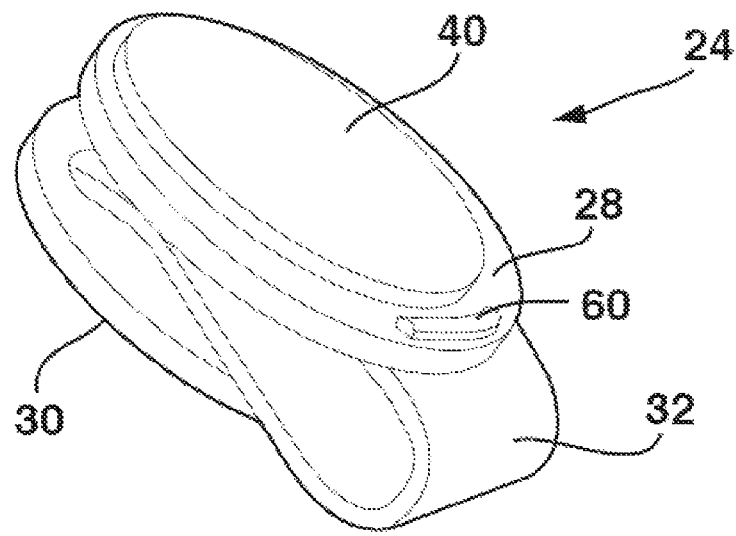
FIG. 4 is a perspective view of one embodiment of an attractant clip.

FIG. 4 is a perspective view of one embodiment of the attractant clip 24. The attractant clip 24 can be constructed of metal or any other suitable material. The attractant clip can have a top surface 28 and a bottom surface 30. The top surface 28 and bottom surface 30 can be joined by connecting member 32, as further described in FIG. 5. The top surface 28 can be imprinted with an image or logo or otherwise engraved or marked, which such marking can encourage the use of the attractant clip 24. The bottom surface 30 can have at least one cavity 38 wherein the pest attractant 26 can be applied to entrap pests 14. The top surface 28, bottom surface 30, and the connecting member 32 can all be one piece, separate pieces, or any combination thereof.

Figure 5:
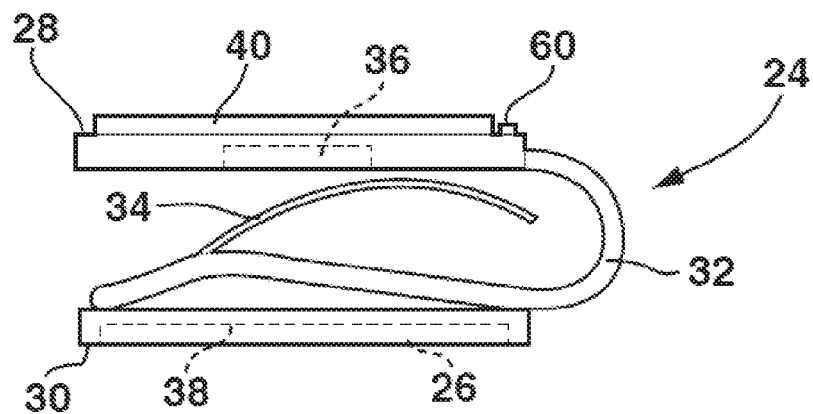
FIG. 5 is side view of one embodiment of an attractant clip.

FIG. 5 is side view of one embodiment of the attractant clip 24. The attractant clip 24 can have a tension spring 34 used to secure the attractant clip 24 to a head covering 16. The tension spring 34 can be part of the connecting member 32 or it can be fastened by solder, adhesive, fusion or the like, to the connecting member 32. The attractant clip 24 can also have a stop 60. The stop 60 can be used in conjunction with an accessory marker 40. The accessory marker 40 can be made of metal, as well, can be imprinted with an image or logo or otherwise marked. One or more accessory markers 40 can be stacked on the top surface 28 adjacent to the stop 60 and can be held in place by a magnet 36. Accessory markers 40 can be used by a person 12, for example, a golfer to mark a ball location, a hiker to mark a trail location, or the like to leave a mark in an environment 18.

Figure 6:
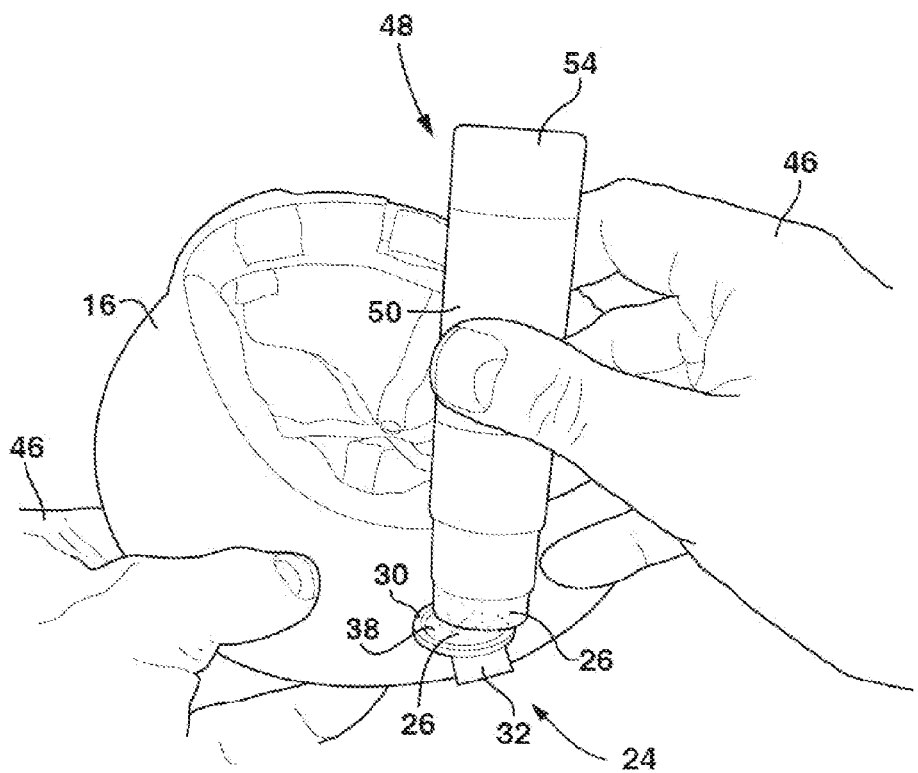
FIG. 6 is an illustration of a method of applying an attractant 26 to one embodiment of an attractant clip 24.

FIG. 6 is an illustration of a method of applying an attractant 26 to one embodiment of an attractant clip 24. A person can after engaging an attractant clip 24 with a head covering's 16 bill, brim, visor and the like, invert the head covering 16, wherein the bottom surface 30 will be upright exposing a cavity 38. A person can then open a pest attractant applicator 48 by removing a lid 52 and holding the body 50 of the applicator 48 with one hand 46, then using the other hand 46 to advance the pest attractant 26 from within the body 50 of the applicator 48 by turning a knob 54 that is located at the bottom of the applicator 48. After an amount of pest attractant 26 is advanced beyond the opening of the body 50 of the applicator 48, a person can then apply the pest attractant 26 to the cavity 38 on the bottom surface 30 of an attractant clip 24.

Figure 7:
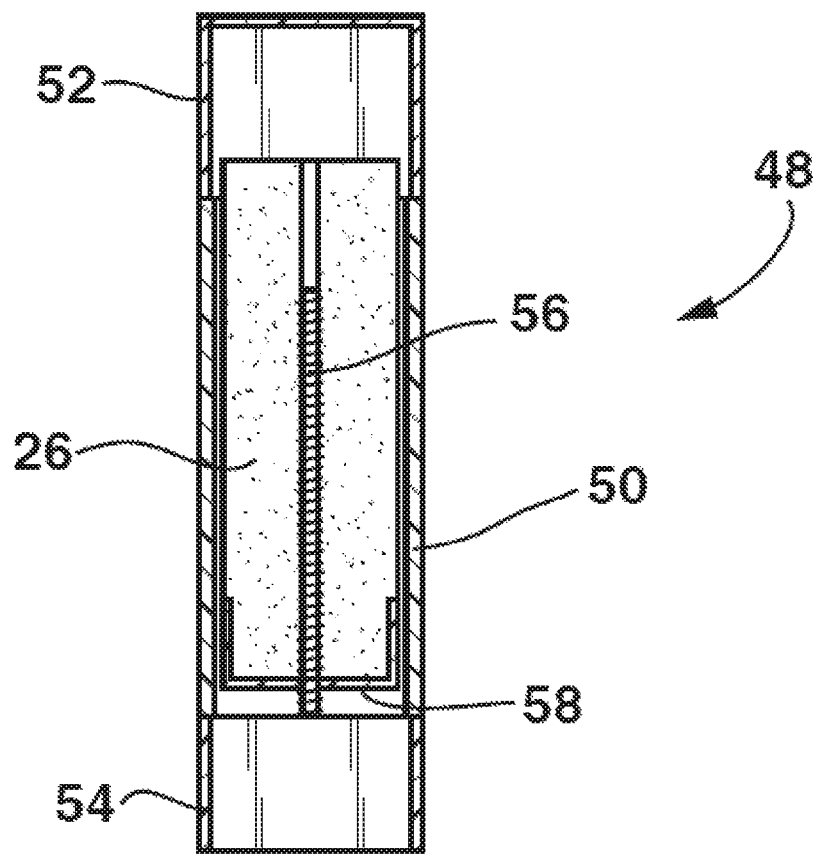
FIG. 7 is a perspective view of a pest attractant applicator.

FIG. 7 is a perspective view of a pest attractant applicator 48. The attractant applicator 48 can come in different sizes and shapes, such as an applicator, a cartridge, a tube and the like. The attractant applicator 48 can have a lid 52 that comes off completely through the use of a detent or the like, or the lid 52 and the top of the body 50 are threaded and the lid 52 can be twisted off and on. The applicator 48 can have a lid that is fastened to the body 50 of the applicator 48 by means of a hinge, detent, or the like. Extraction of the attractant 26 from the applicator 48 can be a linear actuator application when the knob 54 is rotated. There can be a base piece or carriage 58 that is housed within the body 50 of the applicator 48 and engaged by a linear actuator, which can also be housed within the body 50 of the applicator 48. The pest attractant 26 can be situated within the body 50 of the applicator 48 and on top of the base piece. As the knob 54 is rotated, the base piece is moved up the threaded rod and the pest attractant is expelled from the body 50 of the applicator 48. Other applicators that can apply a viscid material are contemplated, for example, a squeeze tube.

The pest attractant 26 can be comprised of a grease makeup base, impregnated with carbon dioxide, sweetener and a sticky, viscid matter. The formulation for pest attractant 26 can allow it to be of a moldable solid form, in which it can be applied by pressure and rubbing on the cavity 38 of the bottom surface 30 of an attractant clip 24. The pest attractant can stay moist for at least five hours after dispensing and applying to the cavity 38 of the attractant clip 24.

Figure 8:
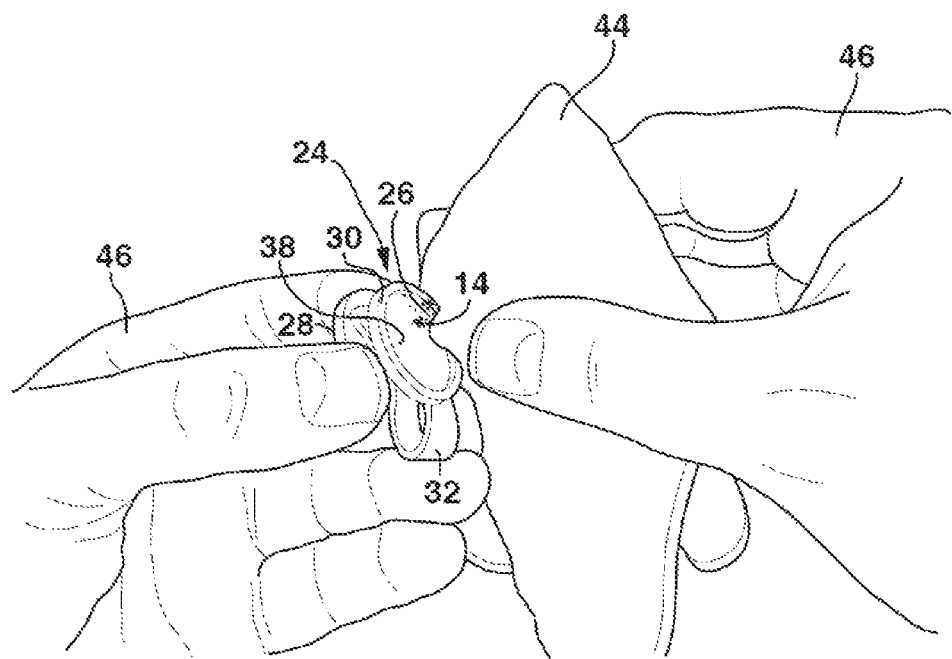
FIG. 8 is an illustration of a method of cleaning an attractant clip.

FIG. 8 is an illustration of a method of cleaning an attractant clip 24. A person can hold an attractant clip 24 in one hand 46 wherein the bottom surface 30 is upright and the cavity 38 is exposed. A person can use a cleaning cloth 44 with the other hand 46 to wipe out the pest attractant 26 and entrapped pests 14 that are in the cavity 38 of the attractant clip 24. The cleaning cloth 44 can be made of microfiber cloth, paper, or any other type of cloth or paper or the like. The cleaning cloth 44 can be washed and reused or it can be a disposable cloth that is thrown out after each use, or any combination thereof. The attractant clip 24 is then ready to be used again, as described above in FIG. 6.

Figure 9:
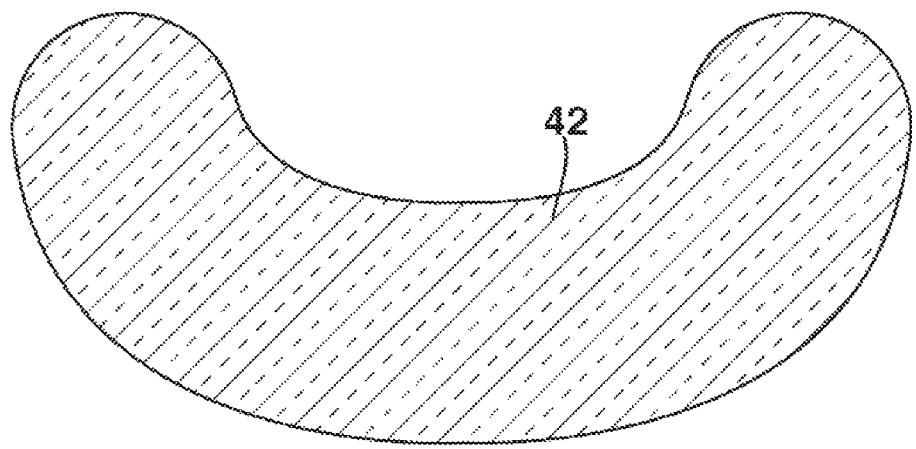
FIG. 9 is a perspective view an attractant visor.

FIG. 9 is a perspective view of an attractant visor 42. The attractant visor 42 can have an upper surface and a lower surface. The upper surface can be releasable and engageable with the underside of a head covering's bill, brim, visor, or the like. The upper surface can be engaged with the use of an adhesive, double-sided tape, Velcro™, clips, alligator clips, snaps, or the like. The attractant visor 42 can be made out of a sturdy and flexible plastic with at least a 0.06 to 0.12 inch thickness. The lower surface of the attractant visor 42 would be used to apply the pest attractant 26 to, as described more fully in FIG. 10. The attractant visor 42 can come in one size, or it may come in different sizes, or it can be of a larger size with the ability to be cut to a specific size depending on the head covering's 16 specific bill, brim, visor, or the like, size constraints, or any combination thereof.

Figure 10:
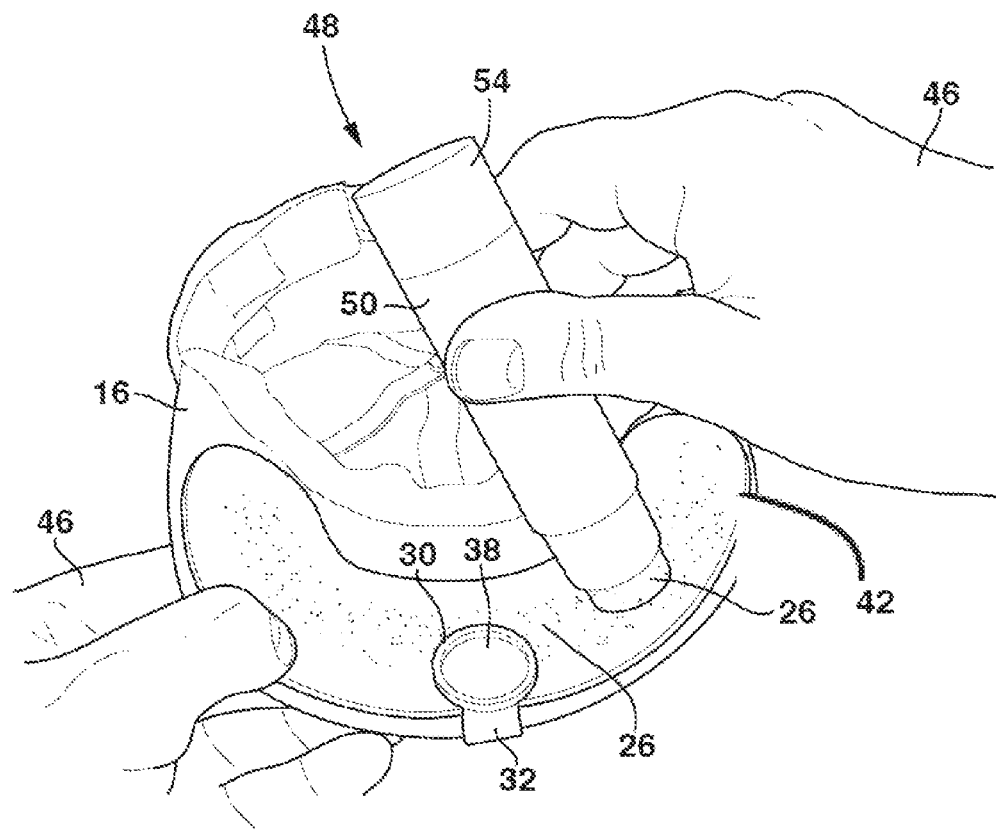
FIG. 10 is an illustration of a method of applying pest attractant to an attractant visor; and, FIG. 11 is an illustration of a method of cleaning an attractant visor.

FIG. 10 is an illustration of a method of applying pest attractant 26 to an attractant visor 42. A person can attach the upper surface of an attractant visor 42 to the underside of a head covering's 16 bill, brim, visor, and the like and invert the head covering such that the lower surface of the attractant visor 42 is exposed. A person can then open a pest attractant applicator 48 by removing a lid and holding the body 50 of the applicator 48 with one hand 46, then use the other hand 46 to advance the pest attractant 26 from within the body 50 of the applicator 48 by turning a knob 54 that is located at the bottom of the applicator 48. After an amount of pest attractant 26 is advanced beyond the opening of the body 50 of the applicator 48, a person can apply the pest attractant 26 to the bottom surface of an attractant visor 42. The use of an attractant visor 42 provides for a greater area in which to apply attractant 26 and entrap pests 14.

Figure 11:
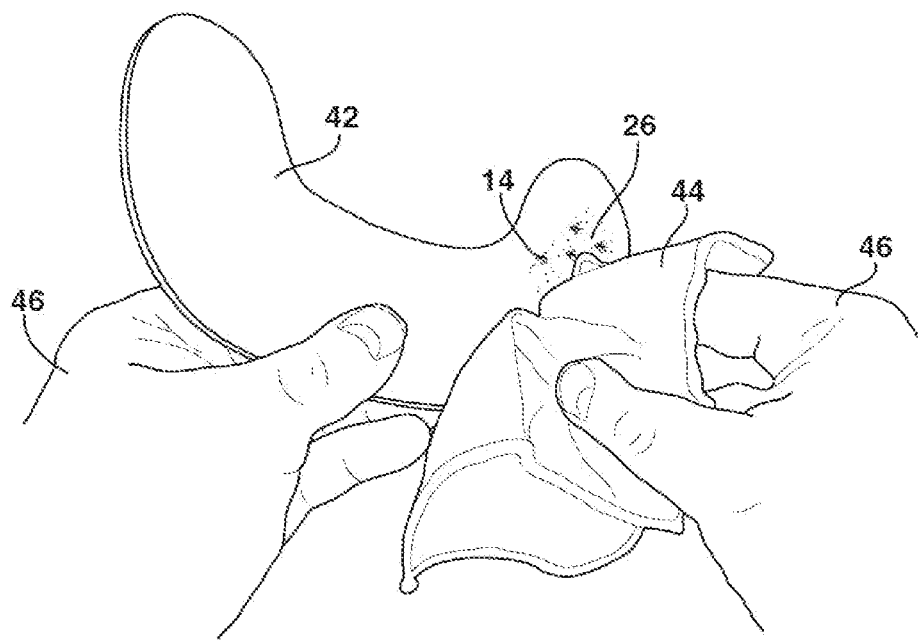

FIG. 11 is an illustration of a method of cleaning an attractant visor 42. A person can hold a head covering 16 inverted in one hand 46 wherein the bottom surface of an attractant visor 42 is exposed. A person can use a cleaning cloth 44 with the other hand 46 to wipe the bottom surface of the attractant visor 42 removing the pest attractant 26 and entrapped pests 14 that are entrapped in the attractant 26 on the attractant visor 42. The cleaning cloth 44 can be made of microfiber cloth, or any other type of cloth or paper or the like. The cleaning cloth 44 can be washed and reused or it can be a disposable cloth that is thrown out after each use, or any combination thereof. The attractant visor 42 is then ready to be used again, as described above in FIG. 10. The attractant visor 42 can be reusable or it can be disposable or any combination thereof.

The preceding description has been presented only to illustrate and describe exemplary embodiments of invention. It is not intended to be exhaustive or to limit the invention to any precise form disclosed. Many modifications and variations are possible in light of the above teaching. Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

What is claimed is:

1. An apparatus for controlling flying insects around the head of a person, the apparatus comprising:
   a head covering, wherein said head covering further comprises a shade producing feature, wherein said shade producing feature is attached to said head covering, and wherein said shade producing feature further comprises an underside and a topside;
   a pest entrapment device, wherein said device is releasably engaged with said shade producing feature, wherein said pest entrapment device comprises at least a single member, wherein said member further comprises an upper surface and a lower surface, wherein said upper surface is engaged with said underside of said shade producing feature of said head covering, and wherein said lower surface further comprises at least one cavity; and
   a pest attractant, wherein said pest attractant is applied to said at least one cavity, wherein said at least one cavity comprises an exposed region on the lower surface such that pests may enter the device and be trapped in the attractant.

2. The apparatus of claim 1, wherein said head covering is at least one of the following group: a hat, a fishing hat, a cap, a hunting cap, a baseball cap, a golf cap, a tennis cap, a bike helmet, or a mountain climbing helmet.

3. The apparatus of claim 1, wherein said shade producing feature includes at least one of the following: bills, brims, and visors.

4. The apparatus of claim 1, wherein said pest attractant comprises grease, carbon dioxide, sweetener, and a sticky, viscid matter.

5. The apparatus of claim 4, wherein said member is releasably engaged with said shade producing feature by an attachment device.

6. The apparatus of claim 1, wherein said pest entrapment device is an attractant clip, wherein said clip further comprises an upper member, a lower member, and a connecting member, wherein said connecting member is U-shaped and is releasably engaged with said shade producing feature, wherein said upper member is in contact with said topside of said shade producing feature and said lower member is in contact with said underside of said shade producing feature, and wherein said lower member further comprises at least one cavity, wherein said pest attractant is applied to said at least one cavity.

7. The apparatus of claim 6, wherein the said upper member, lower member, and connecting member are all one piece, or all separate pieces, or any combination thereof.

8. The apparatus of claim 6, wherein said clip comprises a material selected from the croup consisting of iron, steel, ferrous material, aluminum, tin, any combination thereof, plastic and composite.

9. The apparatus of claim 6, wherein said connecting member of said clip is at least one of the following: spring clip, tension clip, or alligator clip.

10. The apparatus of claim 6, wherein said upper member of said clip includes a stop and a magnet to affix an object to said upper member of said clip.

11. The apparatus of claim 1, wherein said pest entrapment device and said member is an attractant visor, wherein said attractant visor further comprises an upper surface and a lower surface, wherein said attractant visor is releasably engaged with said shade producing feature, wherein said upper surface is in contact with said underside of said shade producing feature, and wherein said pest attractant is applied to said lower surface of said attractant visor.

12. An apparatus for controlling flying insects around the head of a person, the apparatus comprising:
   a head covering, wherein said head covering further comprises a shade producing feature, wherein said shade producing feature is attached to said head covering, wherein said shade producing feature comprises a bill, brim, or visor, wherein said shade producing feature further comprises an underside and a topside;
   a pest entrapment device, wherein said device is releasably engaged with said shade producing feature, wherein said device comprises an upper surface and a lower surface, wherein said upper surface is engaged with said underside of said shade producing feature of said head covering, and said device further comprising at least one cavity wherein said pest attractant is applied to said at least one cavity; and wherein said device is a clip, wherein said clip is made of a material selected from the group consisting of metal, plastic and composite, and further comprises at least an upper member, a lower member, and a connecting member, wherein said upper member, lower member and connecting member are all one piece, or separate pieces, or any combination thereof; and
   a pest attractant, wherein said pest attractant is applied to said at least one cavity, wherein said at least one cavity comprises an exposed region on the lower surface such that pests may enter the device and be trapped in the attractant.

13. The apparatus of claim 12, wherein said head covering is one of the following group: a hat, a fishing hat, a cap, a hunting cap, a baseball cap, a golf cap, a tennis cap, a hood, a bike helmet, or a mountain climbing helmet.

14. The apparatus of claim 12, wherein said device is made out of a material selected from the group consisting of metal, plastic or composite, and includes tension springs or other suitable clamping mechanisms.

15. The apparatus of claim 12, wherein said device is at least a single member comprising of an upper surface and a lower surface, wherein said upper surface is releasably engaged with said shade producing feature, wherein said lower surface contains at least one cavity, wherein said pest attractant is applied to said at least one cavity.

* * * * *